(12) United States Patent
Green et al.

(10) Patent No.: US 11,079,593 B2
(45) Date of Patent: Aug. 3, 2021

(54) HEADS UP DISPLAY SYSTEM

(71) Applicant: International Business Machines Corporation, Armonk, NY (US)

(72) Inventors: Byron S. Green, Poughkeepsie, NY (US); John S. Werner, Fishkill, NY (US); Arkadiy O. Tsfasman, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/199,793

(22) Filed: Nov. 26, 2018

(65) Prior Publication Data

US 2020/0166746 A1 May 28, 2020

(51) Int. Cl.
| | |
|---|---|
| *G02B 27/01* | (2006.01) |
| *B60W 30/095* | (2012.01) |
| *G08G 1/16* | (2006.01) |
| *B60W 40/09* | (2012.01) |
| *B60Q 9/00* | (2006.01) |

(52) U.S. Cl.
CPC ......... *G02B 27/0101* (2013.01); *B60Q 9/008* (2013.01); *B60W 30/095* (2013.01); *B60W 40/09* (2013.01); *G08G 1/166* (2013.01); *B60W 2540/26* (2013.01); *B60W 2554/00* (2020.02); *G02B 2027/014* (2013.01); *G02B 2027/0138* (2013.01)

(58) Field of Classification Search
CPC ........ G02B 27/0101; G02B 2027/0138; G02B 2027/014; B60Q 9/008; B60W 30/095; B60W 40/09; B60W 2540/26; B60W 2550/10; G08G 1/166

See application file for complete search history.

(56) References Cited

U.S. PATENT DOCUMENTS

| | | | |
|---|---|---|---|
| 6,268,793 B1 * | 7/2001 | Rossi .................... | B60Q 1/302 340/436 |
| 6,703,944 B1 * | 3/2004 | Obradovich ........ | B60R 16/0231 340/903 |
| 6,756,916 B2 * | 6/2004 | Yanai .................. | B60R 21/0132 340/438 |

(Continued)

FOREIGN PATENT DOCUMENTS

KR   20140007709 A   1/2014

OTHER PUBLICATIONS

Park et al.; "Augmented Reality and Representation in Vehicle for Safe Driving at Night"; Dated: Oct. 28-30, 2015; 3 pages.

(Continued)

*Primary Examiner* — Hai Phan
*Assistant Examiner* — Son M Tang
(74) *Attorney, Agent, or Firm* — Cantor Colburn LLP; Teddi Maranzano (57) ABSTRACT

Methods, systems and computer program products for identifying non-standard driving behavior are provided. Aspects include receiving, from one or more sensors associated with a vehicle, vehicle operation data for a vehicle driving environment associated with the vehicle, analyzing the vehicle operation data to identify one or more other vehicles engaged in non-standard operation, and overlaying, on a display, an alert indicia highlighting the one or more other vehicles.

19 Claims, 6 Drawing Sheets

(56) References Cited

U.S. PATENT DOCUMENTS

| | | | | |
|---|---|---|---|---|
| 7,349,768 | B2* | 3/2008 | Bruce | G01C 21/005 701/1 |
| 7,382,274 | B1* | 6/2008 | Kermani | B60K 31/0058 340/901 |
| 7,647,180 | B2* | 1/2010 | Breed | G08G 1/161 340/436 |
| 7,840,342 | B1* | 11/2010 | Breed | G08G 1/161 340/435 |
| 8,068,979 | B2* | 11/2011 | Breed | G08G 1/161 340/438 |
| 8,098,171 | B1 | 1/2012 | Szczerba et al. | |
| 8,384,531 | B2* | 2/2013 | Szczerba | G01S 13/723 340/435 |
| 8,514,099 | B2* | 8/2013 | Seder | B60W 30/095 340/438 |
| 9,141,582 | B1* | 9/2015 | Brinkmann | G07C 5/0808 |
| 9,162,622 | B2 | 10/2015 | Szczerba et al. | |
| 9,390,451 | B1* | 7/2016 | Slusar | G06Q 40/08 |
| 9,676,386 | B2* | 6/2017 | Remillard | B60W 30/143 |
| 9,704,403 | B2* | 7/2017 | Chen | G05D 1/0055 |
| 9,805,601 | B1* | 10/2017 | Fields | G06Q 40/08 |
| 10,042,359 | B1* | 8/2018 | Konrardy | B60W 30/12 |
| 10,347,125 | B2* | 7/2019 | Camacho | B60W 50/14 |
| 10,540,892 | B1* | 1/2020 | Fields | G08G 1/096741 |
| 2002/0035422 | A1* | 3/2002 | Sasaki | G07C 5/085 701/32.2 |
| 2002/0171542 | A1* | 11/2002 | Bloomfield | B60Q 1/302 340/464 |
| 2003/0191586 | A1* | 10/2003 | Miller | G08G 1/163 701/301 |
| 2006/0164219 | A1 | 6/2006 | Knoll | |
| 2008/0129541 | A1* | 6/2008 | Lu | G06K 9/00791 340/905 |
| 2009/0212930 | A1* | 8/2009 | Pfeiffer | B60Q 9/008 340/435 |
| 2010/0020169 | A1* | 1/2010 | Jang | G01C 21/36 348/115 |
| 2010/0104199 | A1* | 4/2010 | Zhang | G08G 1/165 382/199 |
| 2010/0191391 | A1* | 7/2010 | Zeng | G01S 13/87 701/1 |
| 2010/0253918 | A1* | 10/2010 | Seder | G08G 1/165 353/13 |
| 2010/0254019 | A1* | 10/2010 | Cui | G01S 13/867 359/633 |
| 2010/0289632 | A1* | 11/2010 | Seder | G02B 27/01 340/436 |
| 2010/0292886 | A1* | 11/2010 | Szczerba | G01C 21/365 701/31.4 |
| 2011/0029230 | A1* | 2/2011 | Kimura | G01C 21/3461 701/533 |
| 2011/0140921 | A1* | 6/2011 | Pampus | B62D 15/027 340/932.2 |
| 2012/0112895 | A1* | 5/2012 | Jun | G01S 5/0247 340/435 |
| 2012/0139716 | A1* | 6/2012 | Nagamine | B60Q 9/004 340/438 |
| 2013/0093582 | A1* | 4/2013 | Walsh | B60Q 1/525 340/436 |
| 2013/0214918 | A1* | 8/2013 | Schumann | G01S 13/02 340/435 |
| 2014/0043482 | A1* | 2/2014 | Chiu | G07C 5/0866 348/148 |
| 2014/0207325 | A1* | 7/2014 | Mudalige | B62D 15/025 701/26 |
| 2015/0035663 | A1* | 2/2015 | Sugano | G08G 1/166 340/436 |
| 2015/0127570 | A1* | 5/2015 | Doughty | G06Q 10/00 705/325 |
| 2016/0257199 | A1 | 9/2016 | Bark et al. | |
| 2016/0264045 | A1* | 9/2016 | Ng-Thow-Hing | G01S 7/22 |
| 2017/0166123 | A1* | 6/2017 | Bahgat | B60W 30/0956 |
| 2017/0278305 | A1* | 9/2017 | Sisbot | G06T 19/006 |
| 2017/0329331 | A1* | 11/2017 | Gao | B60W 50/0098 |
| 2017/0365165 | A1* | 12/2017 | Landfors | B60W 30/14 |
| 2018/0052458 | A1* | 2/2018 | Tsuji | B60W 50/14 |
| 2018/0053413 | A1* | 2/2018 | Patil | G01S 11/14 |
| 2018/0079413 | A1* | 3/2018 | Herrero | G06Q 10/00 |
| 2018/0143035 | A1* | 5/2018 | Ricci | G01C 21/3407 |
| 2018/0297590 | A1* | 10/2018 | Kang | B60W 30/09 |
| 2019/0329770 | A1* | 10/2019 | Rajab | H04L 67/12 |
| 2020/0003569 | A1* | 1/2020 | Polanowski | G01C 21/3461 |
| 2020/0019165 | A1* | 1/2020 | Levandowski | G06N 20/00 |
| 2020/0062249 | A1* | 2/2020 | Light | B60W 30/0956 |

OTHER PUBLICATIONS

Park et al.; "Augmented Reality for Collision Warning and Path Guide in a Vehicle"; Dated: Nov. 13-15, 2018; 1 page.

Verroios et al.; "Alerting for Vehicles Demonstrating Hazardous Driving Behavior"; Dated: May 20, 2012; 8 pages.

* cited by examiner

HEADS UP DISPLAY SYSTEM

BACKGROUND

The invention relates generally to vehicle heads up displays (HUDs) and, more specifically, to an augmented reality HUD system for identifying non-standard driving behavior.

Motor vehicle technology has seen an increased focus in driver assistance technology being integrated in the motor vehicle platforms to assist with the operation of the motor vehicles. However, certain types of non-standard driving behavior of other drivers can be difficult to detect and identify quickly. Even with driver assistance technology, a driver may only have a short amount of time to interpret what is considered non-standard and potentially hazardous driving behavior and determine how to react to this driving behavior.

SUMMARY

According to an embodiment, a system for identifying non-standard driving behavior is provided. The system includes a memory having computer readable computer instructions, and a processor for executing the computer readable instructions. The computer readable instructions include receiving, from one or more sensors associated with a vehicle, vehicle operation data for a vehicle driving environment associated with the vehicle, analyzing the vehicle operation data to identify one or more other vehicles engaged in non-standard operation, and overlaying, on a display, an alert indicia highlighting the one or more other vehicles.

According to another embodiment, a method for identifying non-standard driving behavior is provided. The method includes receiving, from one or more sensors associated with a vehicle, vehicle operation data for a vehicle driving environment associated with the vehicle, analyzing the vehicle operation data to identify one or more other vehicles engaged in non-standard operation, and overlaying, on a display, an alert indicia highlighting the one or more other vehicles.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes receiving, from one or more sensors associated with a vehicle, vehicle operation data for a vehicle driving environment associated with the vehicle, analyzing the vehicle operation data to identify one or more other vehicles engaged in non-standard operation, and overlaying, on a display, an alert indicia highlighting the one or more other vehicles.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
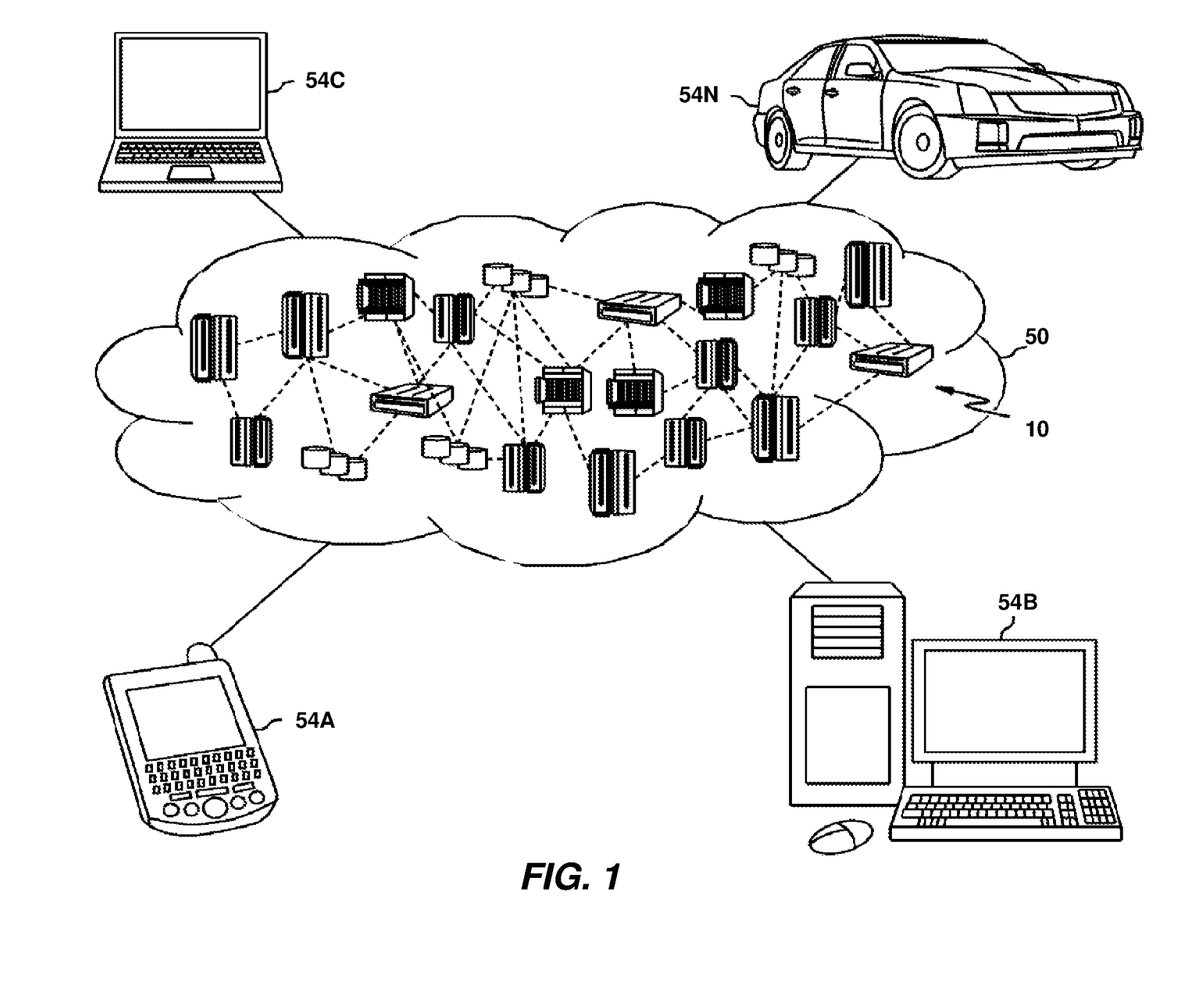
FIG. 1 depicts a cloud computing environment according to one or more embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
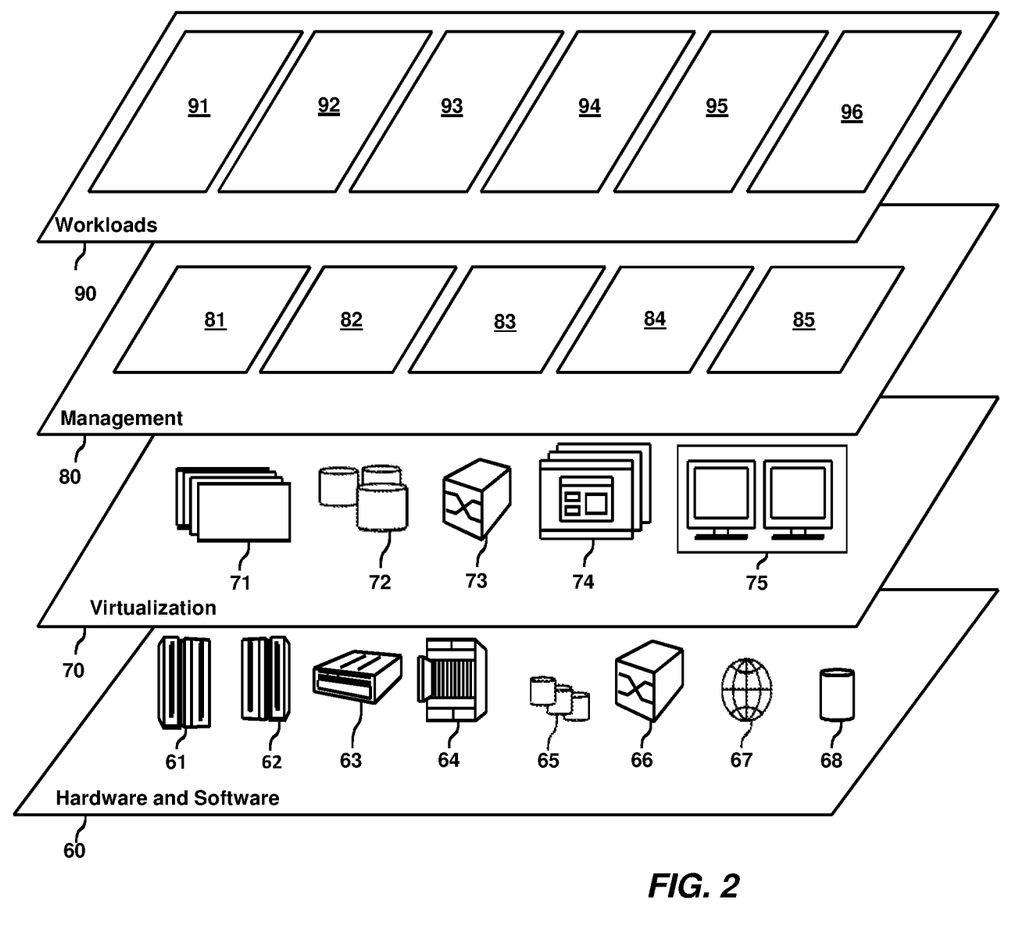
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying non-standard driving behavior 96.

Figure 3:
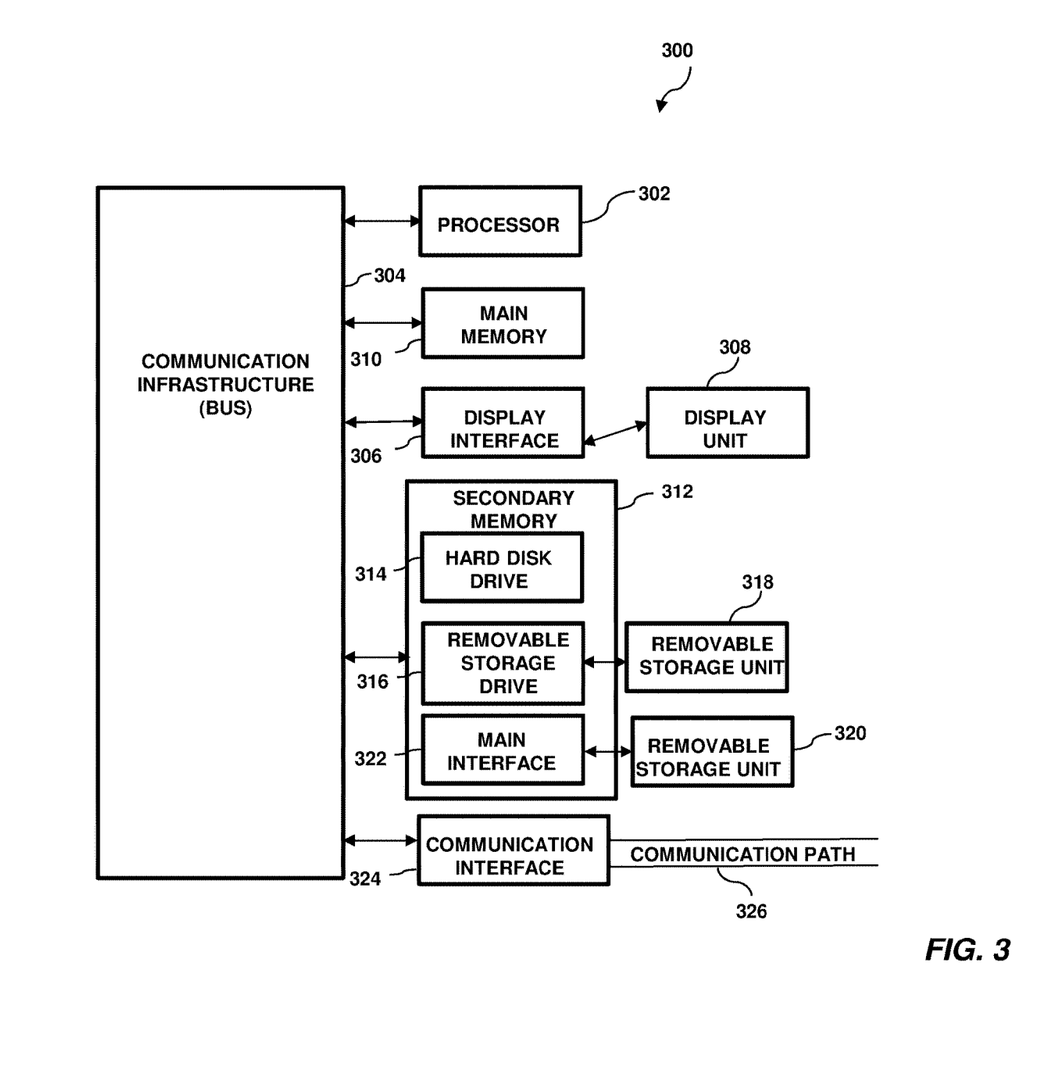
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Turning now to an overview of technologies that are more specifically relevant to aspects of the invention, heads up display (HUD) systems offer a variety of useful information to a driver while operating a motor vehicle. Typical HUD systems include a semi-transparent display area that allows a driver to see through the display area on a windshield to view their driving environment. In the semi-transparent area display, the HUD is able to project or overlay images including vehicle information such as the vehicle speed so that a driver can have access to this information without changing their focus from the roadway. These HUD systems decrease the time a driver is not focused on the roadway to access certain information because the HUD is providing this information in the semi-transparent display area. Despite the availability of HUD systems in vehicles, these systems do not identify other drivers on the roadway that are operating their vehicles in a non-standard manner.

Turning now to an overview of the aspects of the invention, one or more embodiments of the invention address the above-described shortcomings of the prior art by providing a system for identifying non-standard driving behavior for other drivers on a shared roadway. The system includes sensors, cameras, and a HUD that can determine non-standard and potentially hazardous driving behavior of vehicles in the vicinity of a vehicle operating the system. Once identified, the HUD can overlay indicators on the display to highlight the drivers that are operating in a non-standard manner. The display, as described above, can be a semi-transparent display on the windshield of the vehicle operating the system. Some examples of non-standard operations for motor vehicles include speeding, swerving on the roadway, failing to maintain a lane on the roadway, failing to yield and/or stop at stop signs or stop lights, and the like.

Figure 4:
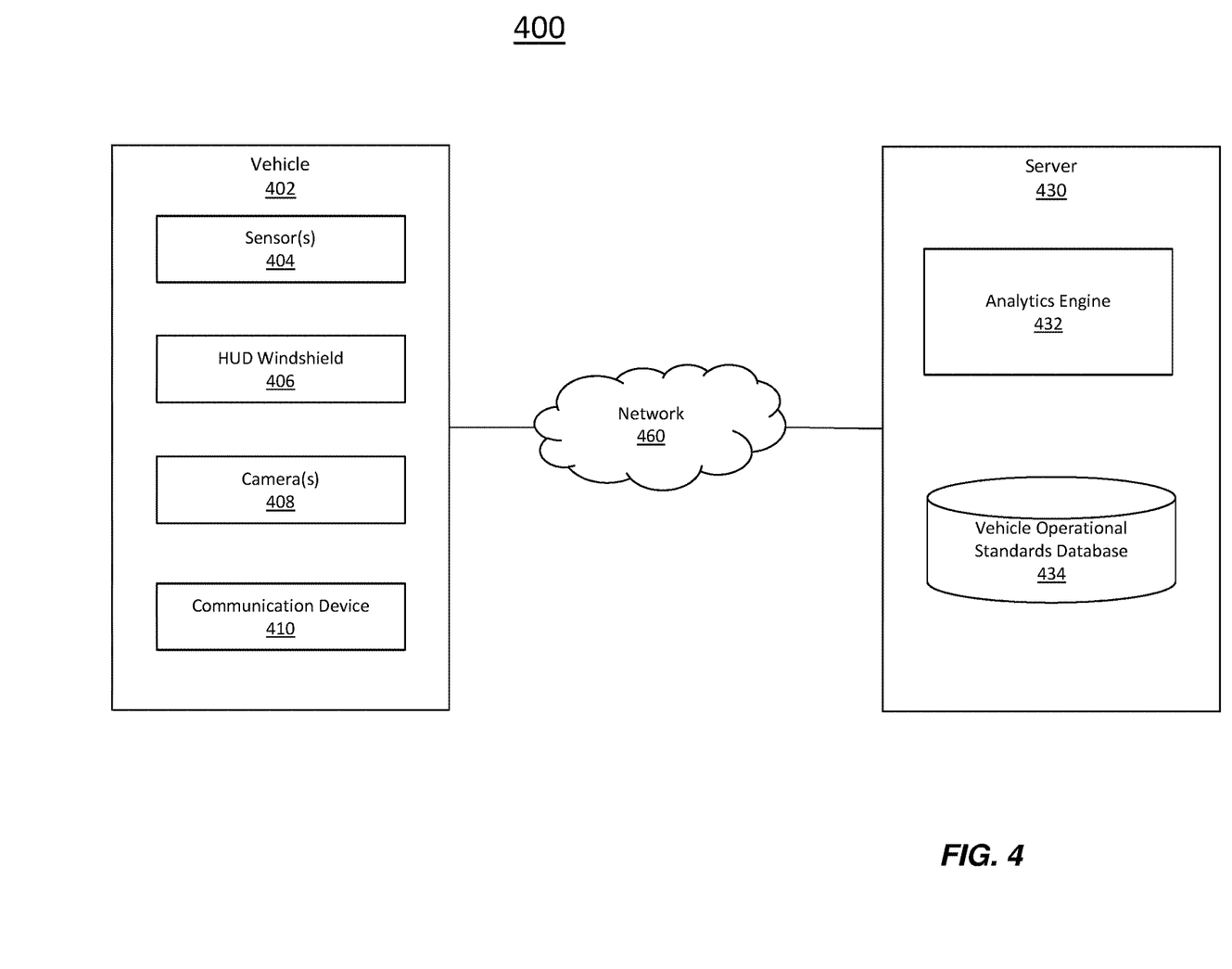
FIG. 4 depicts a system a system upon which the identification of non-standard driving behavior may be implemented will now be described in accordance with an embodiment.

Turning now to a more detailed description of aspects of the present invention, FIG. 4 depicts a system 400 upon which the identification of non-standard driving behavior may be implemented will now be described in accordance with an embodiment. The system 400 shown in FIG. 4 includes a vehicle 402 in communication with a server 430 through a network 460. The vehicle 402 includes one or more sensors 404, a HUD windshield 406, one or more cameras 408, and a communication device 410 to communicate with the server 430. The vehicle 402 can utilize the sensors 404 and cameras 408 to collect data for the vehicle driving environment associated with the vehicle 402. The vehicle driving environment can include data associated with other drivers/vehicles on the roadway within a certain proximity of the vehicle 402. Also, the vehicle driving environment can include weather conditions such as rain, snow, fog, and the like as well as conditions associated with the roadway such as wet, clear, icy, and the like. For example, drivers would be expected to slow down by 5 mph when rain is detected, 10 mph when fog is detected, and 20 mph when snow is detected. In addition, the speed reduction can vary based on the intensity of the weather condition. For example, light snow may be a 5 mph reduction in speed, while a blizzard may force drivers to not exceed 10 mph no matter the posted speed limit on the roadway. The weather conditions can be observed locally by sensors on the vehicle or can be obtained from outside sources such as weather-related web applications. Traffic conditions, signaling devices, and traffic signs can also be included in the vehicle driving environment. Traffic conditions can include vehicle congestion on the roadways, segments of the roadway under construction, the presence of pedestrians near the roadway, and the like. Signaling devices include traffic flow indicators such as stop lights or yield lights and traffic signs include items like stop signs and the like.

In one or more embodiments of the invention, the sensors 404 and cameras 408 collect this vehicle operation data for the vehicle driving environment and transmits this vehicle operation data through the communication device 410 to the server 430. The server 430 includes an analytics engine 432 and a vehicle operational standards database 434 that includes information about the proper operation of a motor vehicle under a variety of conditions of a roadway. In one or more embodiments of the invention, the analytics engine 432 can analyze the vehicle operation data for the vehicle driving environment to identify vehicles on the roadway within a certain proximity to the vehicle 402 that are operating in a non-standard manner. In embodiments, the non-standard vehicle operation can include hazardous operations such as, for example, swerving, speeding, and the like. Also, the non-standard vehicle operations can include potentially standard driving operation; however, based on the driving environment (e.g., traffic congestion, inclement weather, etc.), the vehicle is operating in a non-standard manner. For example, a vehicle may be traveling under a speed limit but due to the presence of rain or ice on the roadway, the vehicle is operating in a hazardous manner at their current velocity.

Figure 5:
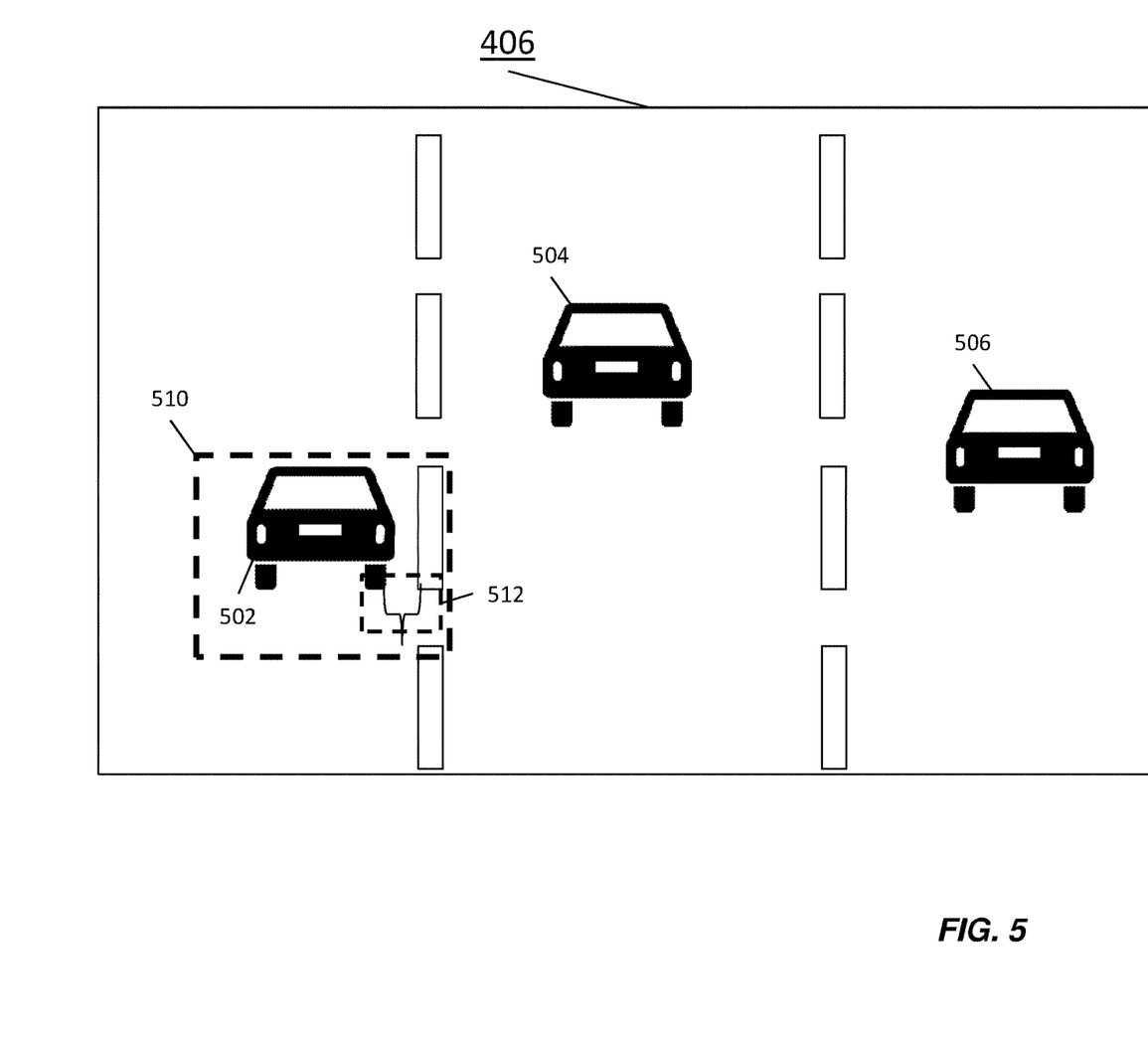
FIG. 5 depicts an example HUD windshield display according to one or more embodiments of the invention.

In one or more embodiments of the invention, once a vehicle is identified as operating in a non-standard manner, the analytics engine 432 can notify the vehicle 402. The HUD windshield 406 can then overlay an alert indication highlighting the non-standard operating vehicle within a view of the driver of the vehicle 402. In embodiments, the HUD windshield 406 includes a semi-transparent display area that allows a driver of the vehicle 402 to view the roadway and also graphical displays overlaid in the semi-transparent display area of the HUD. FIG. 5 depicts an example HUD windshield display according to one or more embodiments. The HUD windshield display 406 allows for viewing of other vehicles (502, 504, and 506) through a semi-transparent display area. Based on an analysis by the analytics engine 432 of the vehicle operation data, vehicle 502 has been determined to be engaged in non-standard vehicle operation in the roadway. An alert indicia 510 is overlaid within the HUD windshield 406 to highlight the vehicle 502 that is engaged in non-standard vehicle operation. In one or more embodiments of the invention, additional alert indications 512 can be overlaid within the HUD windshield 406 to further define the non-standard operation. In the illustrated example of FIG. 5, vehicle 502 is traveling within a lane but is too close to the dividing line of the vehicle lane. The other vehicles 504, 506 are engaged in standard operation and are thus not highlighted within the HUD windshield 406. While the illustrated example shows the alert indication 510, 512 as a dotted box outline of the vehicle 502 and alert condition, in one or more embodiments, the alert indications 510, 512 can include circles, highlighting, and glow effects in a variety of different colors and shapes. In one or more embodiments of the invention, the non-standard driving behavior can be compared to a safety threshold and the alert indications can be different based on the potential hazards presented by the other vehicles on the roadway. For example, if a driver is exceeding the speed limit on the roadway by a certain threshold, the alert indication can have an increase in intensity (e.g., different color (red), flashing, accompanying audio alert, or other visual effect to draw attention to the vehicle). In one or more embodiments of the invention, the alert indication can indicate a level of potential hazard of the driving behavior of other vehicles. For example, different colors or intensity of the color can be used to indicate what the violation was or how severe the violation (e.g., light blue highlighting may indicate a driver going 10 mph over a speed limit, dark blue highlighting may indicate driver going 20 mph over the speed limit, and red may indicate a driver that has failed to stop at a stop sign). Other indications can be used such as, for example, a warning level indication or a point system overlaid on the HUD windshield 406. In one or more embodiments, the analytics engine 432 can determine a potential non-standard or hazardous driving behavior of drivers outside the field of view of the driver of the vehicle 402. The sensors 404 can sense and the analytics engine 432 can determine the location of the non-standard or hazardous driving behavior and highlight said vehicle when entering the field of view in the HUD windshield 406. In addition, the semi-transparent display in the HUD windshield 406 can also be applied to any other windows in the vehicle 402 such as the rear window and side windows. Any highlighting of vehicles or other display features described herein can be displayed on the rear window and/or side windows.

In one or more embodiments of the invention, the analytics engine 432 can access the vehicle operational standards database 434 to assist with identifying non-standard driving behavior of other vehicles on the roadway. The operational standards can be specific to the roadway, region, state, and the like. For example, certain vehicle operations such as turning right at a red light after coming to a complete stop are allowed on certain roadways and not allowed on other roadways.

In one or more embodiments of the invention, the sensors 404 can include, but are not limited to, proximity sensors, speed sensors, ultrasonic sensors, sensors employing LiDAR, and the like. The cameras 408 can include any type of camera including infrared cameras and the like.

In embodiments of the invention, the analytics engine 432 can also be implemented as so-called classifiers (described in more detail below). In one or more embodiments of the invention, the features of the various engines/classifiers (432) described herein can be implemented on the processing system 300 shown in FIG. 3, or can be implemented on a neural network (not shown). In embodiments of the invention, the features of the engines/classifiers 432 can be implemented by configuring and arranging the processing system 300 to execute machine learning (ML) algorithms. In general, ML algorithms, in effect, extract features from received data (e.g., inputs to the engines 432) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 432 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like. In addition, any machine learning models described herein can be trained utilizing camera data and any analysis performed herein can be performed utilizing visual recognition software.

In embodiments of the invention where the engines/classifiers 432 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 400 can be implemented using the processing system 300 applies.

In one or more embodiments of the invention, the cloud computing system 50 can be in wired or wireless electronic communication with one or all of the elements of the system 400. Cloud 50 can supplement, support, or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments of the invention, the vehicle 402 can include microphones or other input devices to collect/receive driver feedback to further train the analytics engine 432 for identifying non-standard driving behavior. For example, if the HUD windshield 406 overlays an alert indication over another vehicle and the driver of the vehicle 402 does not agree that the other vehicle is operating in a non-standard manner, the driver can provide verbal feedback or other feedback (pressing a keypad, etc.) to the analytics engine 432. The analytics engine 432 can utilize this feedback to update any machine learning models utilized to identify the non-standard driving behavior. In one or more embodiments of the invention, the driver feedback can be positive confirming that they agree with the analytics engine 432 identification which can be utilized to further train a machine learning model for the identification of non-standard driving behavior.

In one or more embodiments of the invention, the vehicle 402 can include a global positioning system (GPS) to identify a region and/or roadway segment for the analytics engine 432 to make a determination as to the standard driving operation for the specific region and/or roadway. For example, a GPS location could indicate a speed limit or a construction zone for the road way which would assist with determining what constitutes non-standard and/or potentially hazardous driving behavior.

In one or more embodiments of the invention, the identification of non-standard driving behavior can be determined by a combination of driver environment data taken from the sensors 404 and cameras 408 on the vehicle 402.

For example, for a vehicle that is swerving, the camera 408 data can be analyzed to compare a vehicles distance to road lines (or crossing lines) of the side of a roadway and, if the vehicle has determined that the distance is changing too rapidly, the vehicle is likely swerving. To determine if a vehicle is speeding, sensor 404 data can be collected from the vehicle 402 to determine how fast the vehicle 402 is traveling. Camera data can assist with identifying a rate of change of the vehicle 402 compared to other vehicles positions in successive frames to determine the speed of the other vehicles and compare their speeds to the speed limit for the GPS location to identify whether the other vehicles are speeding. Alternatively, the sensors on the vehicle 402 can identify how fast the vehicle 402 is traveling and compare this speed to the rate of change of proximity sensor readings of nearby vehicles to identify speeding vehicles.

In one or more embodiments of the invention, multiple vehicles can utilize the server 430 and analytics engine 432 for identifying non-standard driving behavior. The GPS location of each vehicle can be recorded when there are other vehicles engaged in non-standard driving behavior. This data can be shared with all vehicles on a roadway operating the system 400 and accessing the server 430 allowing for vehicle to vehicle communication and coordination of tracking these other vehicles engaged in non-standard driving behavior. For example, a first vehicle on the same roadway of a second vehicle may identify a speeding vehicle on the same roadway. The first vehicle is a short distance behind the second vehicle but can transmit an identification of the speeding vehicle so that the second vehicle HUD windshield can highlight the speeding vehicle as it approaches the second vehicle from behind and eventually passes the second vehicle.

Figure 6:
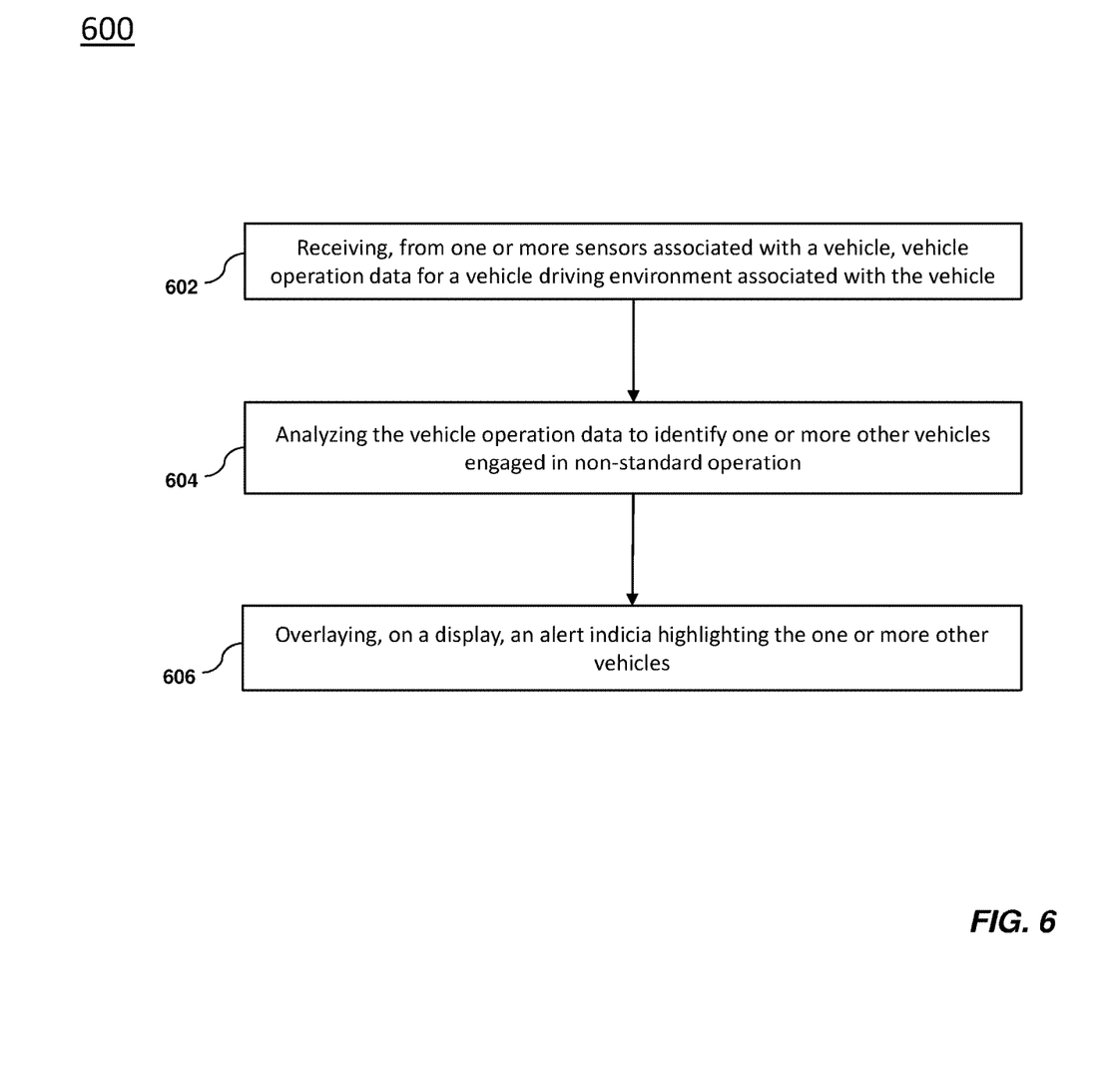
FIG. 6 depicts a flow diagram of a method for identifying non-standard driving behavior according to one or more embodiments of the invention.

Turning now to FIG. 6, a flow diagram of a method 600 for identifying non-standard driving behavior according to one or more embodiments of the invention. The method 600 includes receiving, from one or more sensors associated with a vehicle, vehicle operation data for a vehicle driving environment associated with the vehicle, as shown at block 602. The method 600, at block 604, includes analyzing the vehicle operation data to identify one or more other vehicles engaged in non-standard operation. And at block 606, the method 600 includes overlaying, on a display, an alert indicia highlighting the one or more other vehicles.

Additional processes may also be included. It should be understood that the processes depicted in FIG. 6 represent illustrations, and that other processes may be added or existing processes may be removed, modified, or rearranged without departing from the scope and spirit of the present disclosure.

In one or more embodiments of the invention, a single car in view of the vehicle 402 can be tracked over time to continuously update and show their driving behavior to be getting better and/or worse depending on an increase or decrease in non-standard or hazardous driving behavior. For example, if vehicle 402 is behind a vehicle exhibiting hazardous driving behavior (e.g., swerving), the highlighting of this vehicle in the HUD windshield 406 can change to show an increase or decrease in hazardous behavior (e.g., highlight color changing, etc.).

In one or more embodiments of the invention, the vehicle 402 can store images of license plates and/or vehicles themselves that exhibit non-standard or hazardous driving behavior so that these vehicles can be highlighted if encountered again during the same trip or on different trips taken by the vehicle 402. As many times, drivers utilize the same or similar driving routes on a day to day basis, the identified hazardous drivers can be highlighted when encountered again even when the driver may not be driving hazardously at this new encounter. In one or more embodiments of the invention, the vehicle 402 can have a global positioning system (GPS) that allows for directions to the vehicle 402 destination. The GPS route can be altered based on encounters with drivers exhibiting non-standard or hazardous driving behavior so that the vehicle 402 can avoid these other drivers. In one or more embodiments of the invention, the GPS route can be altered automatically or responsive to an input from the driver. In other embodiments, the altering of the GPS route can be based on a threshold level of a number non-standard or hazardous drivers on the roadway of the vehicle 402. In addition, a threshold level can be set for an intensity of non-standard or hazardous driving behavior and can automatically adjust the route. The adjusting of the route through the GPS can include additional travel time where the additional travel time can be acceptable for adjusting of the route based on the intensity of non-standard and/or hazardous driving behavior of the other vehicles. For example, if a particularly dangerous vehicle is on the same roadway, the GPS may immediately have the vehicle 402 exit the roadway for another route even though the new route would not add much more time than the original route.

In one or more embodiments of the invention, the sensors 404 and cameras 408 can collect data from many different vehicles on different roadways utilized by the vehicle 402. This data can be analyzed by the analytics engine 432 to learn and determine how prevalent certain driving behavior is on certain roadways. For example, if multiple vehicles are too close to a dividing line on a roadway, the analytics engine 432 may determine that the specific roadway has narrow lanes or potholes that are being avoided. In this example, drivers that are too close to the dividing lines in these areas would not be highlighted based on the learned driving behavior for certain roadways. In other embodiments, the analytics engine 432 can learn the driving behavior of multiple vehicles and compare this driving behavior over a sample of vehicles in the roadway. For example, if most vehicles are still driving the speed limit despite the presence of rain, the analytics engine 432 would not highlight each vehicle, in this case. In one or more embodiments, the driver of vehicle 402 can set various preferences for highlighting other vehicles on the roadway. For example, a driver may only be concerned with vehicles that are not maintaining their lanes on a roadway and not concerned with drivers that are speeding. This preference would have the HUD windshield 406 highlighting only vehicles that are swerving or too close to the dividing lines.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for identifying non-standard driving behavior, the system comprising:
    a memory having computer readable instructions; and
    a processor for executing the computer readable instructions, the computer readable instructions including:
        determining, from one or more sensors associated with a vehicle, vehicle operation data associated with the vehicle;
        determining, by accessing an outside server, a vehicle driving environment associated with the vehicle, wherein the vehicle driving environment is determined based on a location of the vehicle determined by the one or more sensors;

analyzing, by a learning model, the vehicle operation data to determine one or more other vehicles engaged in non-standard operation within a pre-defined proximity to the vehicle, wherein the non-standard operation is determined based at least in part on the vehicle driving environment;

overlaying, on a display, a first alert indicium highlighting the one or more other vehicles engaged in non-standard operation;

receiving feedback, from a user, indicating an acceptance or a rejection of the one or more other vehicles engaged in non-standard operation;

updating the learning model based at least in part on the feedback; and adjusting a route on a global positioning system (GPS) for the vehicle based at least in part on the identifying one or more other vehicles engaged in non-standard operation;

determining a first vehicle exhibiting habitual non-standard driving behavior over a period of time;

storing a characteristic of the first vehicle in a memory, wherein the characteristic comprises a license plate;

automatically overlaying, on the display, a second alert indicium highlighting the first vehicle at a new time when encountering the first vehicle in the driving environment.

2. The system of claim 1, wherein the non-standard operation comprises the one or more other vehicles violating at least one traffic guideline.

3. The system of claim 1, wherein the alert indicia further highlights one or more characteristics of the one or more other vehicles causing the non-standard operation.

4. The system of claim 1 further comprising comparing the non-standard operation to a threshold operation level; and based at least in part on the non-standard operation exceeding the threshold operation level, increasing an intensity of the alert indicia.

5. The system of claim 4 further comprising based at least in part on the non-standard operation exceeding the threshold operation level, changing a color of the alert indicia.

6. The system of claim 1, wherein analyzing, by the learning model, the vehicle operation data to identify one or more other vehicles engaged in non-standard operation comprises analyzing a feature vector, generated by the learning model, the feature vector comprising a plurality of features extracted from the vehicle operation data.

7. The system of claim 1, wherein the non-standard operation includes a deviation in speed exceeding a speed threshold of the one or more other vehicles compared to an average speed in the vehicle driving environment.

8. The system of claim 1, wherein the vehicle driving environment comprises a weather condition present; and wherein the non-standard operation includes an operation deemed non-standard based at least in part on the weather condition present.

9. The system of claim 1, wherein the vehicle driving environment comprises a plurality of local driving patterns; and wherein the non-standard operation includes an operation deemed non-standard based at least in part on the plurality of local driving patterns.

10. The system of claim 1, wherein the display is a heads up display in the vehicle.

11. A method for identifying non-standard driving behavior, the method comprising:

determining, from one or more sensors associated with a vehicle, vehicle operation data associated with the vehicle;

determining, by accessing an outside server, a vehicle driving environment associated with the vehicle, wherein the vehicle driving environment is determined based on a location of the vehicle determined by the one or more sensors;

analyzing, by a learning model, the vehicle operation data to determine one or more other vehicles engaged in non-standard operation within a pre-defined proximity to the vehicle, wherein the non-standard operation is determined based at least in part on the vehicle driving environment;

overlaying, on a display, a first alert indicium highlighting the one or more other vehicles engaged in non-standard operation;

receiving feedback, from a user, indicating an acceptance or a rejection of the one or more other vehicles engaged in non-standard operation;

updating the learning model based at least in part on the feedback; and adjusting a route on a global positioning system (GPS) for the vehicle based at least in part on the identifying one or more other vehicles engaged in non-standard operation;

determining a first vehicle exhibiting habitual non-standard driving behavior over a period of time;

storing a characteristic of the first vehicle in a memory, wherein the characteristic comprises a license plate;

automatically overlaying, on the display, a second alert indicium highlighting the first vehicle at a new time when encountering the first vehicle in the driving environment.

12. The method of claim 11, wherein the non-standard operation comprises the one or more other vehicles violating at least one traffic guideline.

13. The method of claim 11, wherein the alert indicia further highlights one or more characteristics of the one or more other vehicles causing the non-standard operation.

14. The method of claim 11 further comprising comparing the non-standard operation to a threshold operation level; and based at least in part on the non-standard operation exceeding the threshold operation level, increasing an intensity of the alert indicia.

15. The method of claim 14 further comprising based at least in part on the non-standard operation exceeding the threshold operation level, changing a color of the alert indicia.

16. The method of claim 11, wherein analyzing, by the learning model, the vehicle operation data to identify one or more other vehicles engaged in non-standard operation comprises analyzing a feature vector, generated by the learning model, the feature vector comprising a plurality of features extracted from the vehicle operation data.

17. A computer program product for identifying non-standard driving behavior comprising a non-transitory computer readable storage medium having program instructions embodied therewith the program instructions executable by a computer processor to cause the computer processor to perform a method, comprising:

determining, from one or more sensors associated with a vehicle, vehicle operation data associated with the vehicle;

determining, by accessing an outside server, a vehicle driving environment associated with the vehicle, wherein the vehicle driving environment is determined based on a location of the vehicle determined by the one or more sensors;

analyzing, by a learning model, the vehicle operation data to determine one or more other vehicles engaged in non-standard operation within a pre-defined proximity to the vehicle, wherein the non-standard operation is determined based at least in part on the vehicle driving environment; and overlaying, on a display, a first alert indicium highlighting the one or more other vehicles engaged in non-standard operation;

receiving feedback, from a user, indicating an acceptance or a rejection of the one or more other vehicles engaged in non-standard operation;

updating the learning model based at least in part on the feedback; and adjusting a route on a global positioning system (GPS) for the vehicle based at least in part on the identifying one or more other vehicles engaged in non-standard operation;

determining a first vehicle exhibiting habitual non-standard driving behavior over a period of time;

storing a characteristic of the first vehicle in a memory, wherein the characteristic comprises a license plate;

automatically overlaying, on the display, a second alert indicium highlighting the first vehicle at a new time when encountering the first vehicle in the driving environment.

18. The computer program product of claim 17, wherein the non-standard operation comprises the one or more other vehicles violating at least one traffic guidelines.

19. The computer program product of claim 17, wherein the alert indicia further highlights one or more characteristics of the one or more other vehicles causing the non-standard operation.

* * * * *